(12) United States Patent
Hynecek

(10) Patent No.: US 7,287,260 B1
(45) Date of Patent: Oct. 23, 2007

(54) COMPACT DISC READER AND METHOD

(75) Inventor: Bryan L. Hynecek, Plano, TX (US)

(73) Assignee: RadioShack, Corp., Fort Worth, TX (US)

( * ) Notice: Subject to any disclaimer, the term of this patent is extended or adjusted under 35 U.S.C. 154(b) by 426 days.

(21) Appl. No.: 10/982,140

(22) Filed: Nov. 5, 2004

(51) Int. Cl.
*G11B 17/03* (2006.01)
*G11B 17/04* (2006.01)

(52) U.S. Cl. ............ 720/600; 720/601; 720/605; 720/612

(58) Field of Classification Search ......... 702/600
See application file for complete search history.

(56) References Cited

U.S. PATENT DOCUMENTS

| | | | |
|---|---|---|---|
| 4,561,078 A * | 12/1985 | Nakayama | 369/30.78 |
| 5,138,591 A * | 8/1992 | Ogawa et al. | 369/30.83 |
| 5,255,254 A * | 10/1993 | Watanabe et al. | 720/647 |
| 5,561,657 A * | 10/1996 | Ogawa | 369/179 |
| 5,682,364 A * | 10/1997 | Ogawa | 369/30.81 |
| 5,917,787 A * | 6/1999 | Tsuchiya et al. | 369/30.81 |
| 6,097,693 A * | 8/2000 | Nakamichi | 720/713 |
| 6,198,716 B1 * | 3/2001 | Tamiya et al. | 369/30.78 |
| 6,445,666 B1 * | 9/2002 | Sato et al. | 720/622 |
| 6,650,603 B2 * | 11/2003 | Michimori et al. | 369/30.82 |
| 6,990,675 B2 * | 1/2006 | Suzuki et al. | 720/672 |

* cited by examiner

*Primary Examiner*—Angel Castro
*Assistant Examiner*—Christopher R. Magee
(74) *Attorney, Agent, or Firm*—Dan Brown Law Office; Daniel R. Brown

(57) ABSTRACT

An apparatus for reading an optical disc. The apparatus includes a housing and a spindle positioned to rotatably support the optical disc adjacent to the exterior of the housing. A light emitting scan head is aligned to read the optical disc as it rotates. A protective member, having a silhouette that is smaller than the area of the optical disc, is movably coupled to the housing between a first position that aligns the protective member to prevent extraneous emission of light from the scan head, and a second position that enables access to mount the optical disc on the spindle. The apparatus may be an audio CD player. The rotating optical disc may be positioned to extend beyond the surface of the housing. A spring disposed between the housing and the protective member, where the spring operates to close the protective member. An actuator detects movement of the protective member, and deactivates light emission from the scan head or stops rotation of the spindle when the protective member moved to an open position.

24 Claims, 6 Drawing Sheets

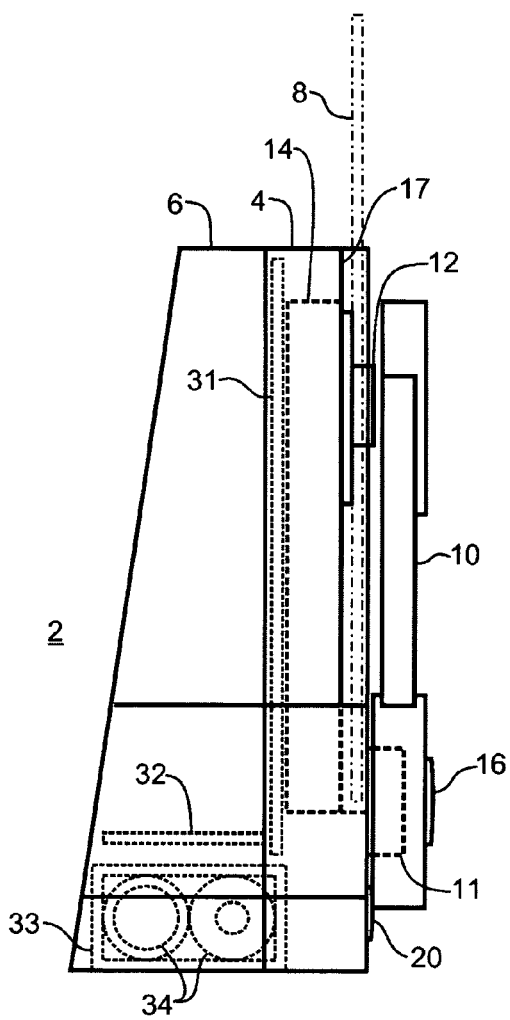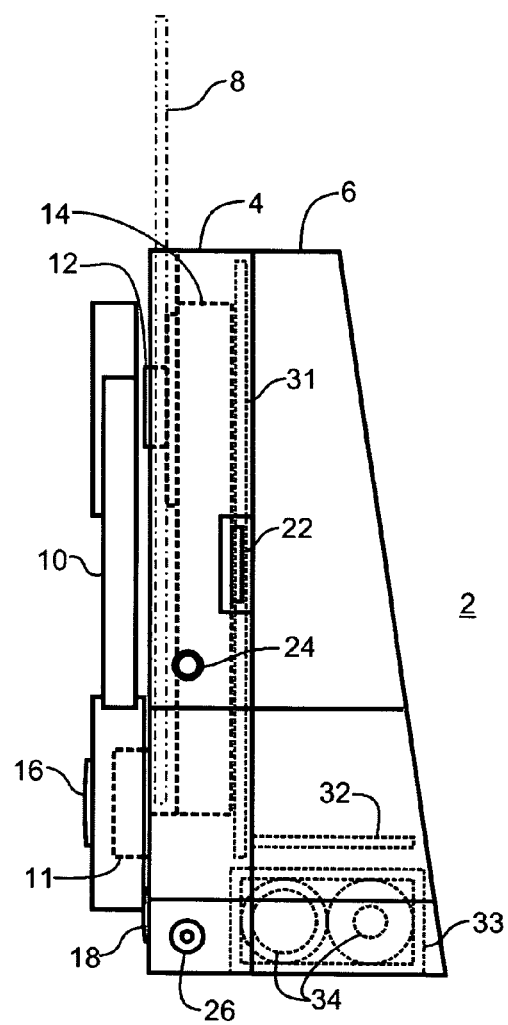
Fig. 5                    Fig. 6

COMPACT DISC READER AND METHOD

BACKGROUND OF THE INVENTION

1. Field of the Invention

The present invention relates to optical disc readers. More specifically, the present invention relates to a low cost open housing compact disc player.

2. Description of the Related Art

The compact disc digital audio player (CD Player) is a ubiquitous tool used in the reproduction of high fidelity audio program content, including commercial entertainment material. The vast majority of popular music is distributed on compact discs (CD's) and many consumers are able to use personal computers to duplicate CD's from their library for personal use. The high volume consumption of CD materials has lead to the high volume production and distribution of CD players. CD player designs are targeted to a wide range of demographics and age groups. Products are available for teens, young children, adults, and even infants and retired persons. As with most consumer electronics products that are produced in high volume, retail price is an important factor in many consumer buying decisions. Accordingly, manufacturers of CD players strive to hold cost to a bare minimum, which translates into competitively priced products in mass distribution, but which still provide reasonable profitability for those in the distribution chain. Of course, product consumer appeal to the features and industrial design of a CD player, as well as price, are also important factors in the consumer buying decisions.

Manufacturers are challenged to hold production costs of CD players to a bare minimum while still providing an attractive product with a design and feature set that appeals to consumers. The essential disc drive and laser assembly used in low cost CD players has been mass produced and cost reduced to an elemental level. The associated electronic circuitry used in CD players has also been minimalized by designers, to the extent that the feature set allows. The internal anatomy of a low cost CD player includes the disc drive motor and laser head module, with an associated dedicated microcontroller, a main controller circuit, which typically includes the audio circuits, a battery and power supply circuit, and the user interface components.

The user interface in prior art CD players typically includes a STOP/OFF key, a PLAY/PAUSE key, a REPEAT key, a SEARCH FORWARD key, a SEARCH BACKWARD key, and perhaps REPEAT, RANDOM PLAY, and/or BASS BOOST keys. Also included are a volume control, a liquid crystal display, a headphone/audio jack, an external power connector, a cover release lever, and a battery compartment lever. To the industrial designer, each of these elements of the user interface represents a cost increase in the CD player. Respecting the housing itself, the prior art CD players typically comprise a large number of individual pieces. These typically include a housing base with separate battery cover, a housing top, a hinged cover, a display lens and display bezel, a keypad frame, a battery holder, and usually a one or more small plastic items that interconnect the other components. In addition, there are usually some graphic elements, logotypes, and self-adhesive stickers that go into the finished product, as well as a user manual.

In addition to the industrial design aspects of a low cost CD player, which are principally focused on cost and consumer appeal, the design must also address safety and performance issue. CD players are prone to reduced performance by the collection of dust and dirt in the mechanical and optical systems. In addition, the laser head in a CD player employs a Class 1 infrared laser, which is an eye-hazard. In the prior art, designers have employed clamshell covers, loading slots, or loading drawers to address these particular issues. Thus it can be understood that there is a need in the art for a cost reduced CD player that has a reduced parts cost, attractive industrial design, and that meets reasonable performance and safety thresholds.

SUMMARY OF THE INVENTION

The need in the art is addressed by the apparatus and methods of the present invention. An apparatus for reading an optical disc is taught. The apparatus includes a housing and a spindle positioned to rotatably support the optical disc adjacent to the exterior of the housing. A light emitting scan head is aligned to read the optical disc as it rotates. A protective member, having a silhouette that is smaller than the area of the optical disc, is movably coupled to the housing between a first position that aligns the protective member to prevent extraneous emission of light from the scan head, and a second position that enables access to mount the optical disc on the spindle.

In a specific embodiment of the foregoing, the apparatus is an audio CD player. In another embodiment, the spindle is positioned relative to the housing such that a substantial portion of the rotating optical disc extends beyond the surface of the housing. In a refinement to the invention, the housing has a recess formed on its exterior surface that partially conforms to the shape of the optical disc, and the spindle is positioned to support the optical disc within that recess. In another embodiment of the invention, the protective member extends to cover the spindle while aligned in the first position. In another specific embodiment, the scan head traverses a linear path when reading the optical disc, and the protective member extends to cover the linear path while aligned in the first position.

In another specific embodiment of the invention, the protective member is movable about an axis of rotation that is parallel to the spindle axis. The invention may further include a spring disposed between the housing and the protective member, where the spring operates to urge the protective member toward the first position. In a refinement to the invention, the apparatus further includes an actuator operable to detect movement of the protective member. The actuator may be coupled to deactivate light emission from the scan head or stop rotation of the spindle when the protective member is urged away from the first position.

The present invention also teaches an apparatus for playing a CD audio optical disc. The apparatus includes a housing with a recess formed on its exterior surface that partially conforms to the shape of the optical disc. There is a spindle for rotatably supporting the optical disc adjacent to the exterior of the housing and within the recess, and it is positioned relative to the housing so that a substantial portion of the rotating optical disc extends beyond the surface of the housing. A light emitting scan head is aligned to traverse a linear path and read the optical disc. A protective member, whose silhouette is smaller than the area of the optical disc, is rotatably coupled to the housing about an axis of rotation that is parallel with the spindle axis. The protective member is rotatable between a first position that aligns the protective member to prevent extraneous emission of light from the scan head by covering the path traversed by the scan head and extends to cover the spindle, and, a second position that enables access to mount the optical disc on the spindle. A spring is disposed between the housing and the protective member, and operates to urge the protective member toward the first position. An actuator detects movement of the protective member. The actuator is coupled to deactivate light emission from the scan head and stop rotation of the spindle when the protective member is urged away from the first position.

The present invention teaches a CD player that includes a housing and a rotating drive mechanism, which provides a means for coupling a CD with the housing. A pivoting protective member has one end mounted to the housing exterior with a shaft diagonally transverse the housing, and another end covering the rotating drive mechanism. In a refinement to the CD player, the housing includes a plurality of housing components such that when fitted together, the housing components provide a means for the housing to rest thereupon.

In another refinement to the CD player, the housing further includes a CD player drive module which includes a servo motor and control processor, connected electrically to the rotating drive mechanism, which provides a means for rotating a CD fixed to the rotating drive mechanism. It also includes a laser diode and photo-transistor optical pair, a linear track, a motor coupled with gear drive and belt assembly, and the control processor, all mounted below the protective member, providing a means for the optical pair to track digital data encoded on a CD by oscillating along the linear track, parallel to the protective member. The CD player also includes an interface module that further includes an interface processor and a plurality of contact closure actuators providing a means for user control of the CD player functions. The interface processor and an audio output circuit provide a means for the CD player to output audio signals wherein the audio output circuit is electrically connected to the base structure via a connection. A power supply module is provided, which includes a power cell charging circuit, a power cell receptacle circuit covered by a removable portion of the housing, and a direct current (DC) input circuit wherein the circuits provide a means for supplying the CD player with a plurality of power means.

The present invention also teaches a method of reading an optical disc in an apparatus having a housing with a spindle positioned to rotatably support the optical disc adjacent to the exterior of the housing, and a light emitting scan head aligned to read the optical disc, and a protective member having a silhouette that is smaller than the area of the optical disc. The method includes the steps of moving the protective member to a first position that aligns the protective member to prevent extraneous emission of light from the scan head, and moving the protective member to a second position, thereby enabling access for mounting the optical disc on the spindle.

In a specific embodiment of the foregoing method, the spindle is positioned relative to the housing such that a substantial portion of the rotating optical disc extends beyond the surface of the housing. In another embodiment, the protective member extends to cover the spindle when moved to the first position. In a refined version of the method, wherein the scan head traverses a linear path when reading the optical disc, the protective member covers the linear path when moved to the first position.

In a specific embodiment of the method, the step of moving the protective member about an axis of rotation that is parallel to the spindle axis is added. In another embodiment, the step of urging the protective member toward the first position by spring force is added. In a particular embodiment of the method, the step of detecting movement of the movable member away form the first position is added. The step of deactivating light emission from the scan head or stopping the spindle rotation upon detecting movement of the protective member may be added.

BRIEF DESCRIPTION OF THE DRAWINGS

FIG. 5 is a left side view drawing of a CD player according to an illustrative embodiment of the present invention.

FIG. 6 is a right side view drawing of a CD player according to an illustrative embodiment of the present invention.

DESCRIPTION OF THE INVENTION

Figure 2:
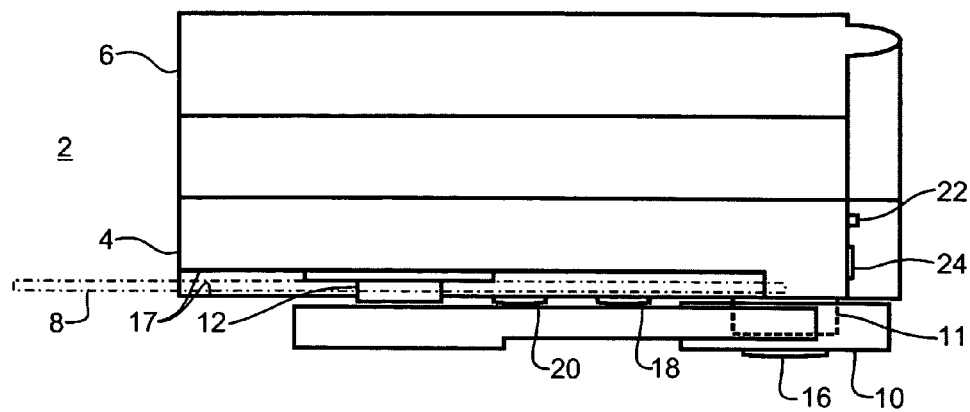
FIG. 2 is a top view drawing of a CD player according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Prior art digital audio players, specifically compact disc players, have complex designs predominately driven by such variables as the functionality of the player, the size of the components used, and the player's desired durability. As such, prior art CD players predominately utilized a design technique in which the outer casing mirrored the shape and form of a CD disc itself, which urged for a smaller mechanism. Furthermore, as components were designed smaller, prior art players were able to function in an efficient manner, while decreasing in size and price. Additionally, the casing was manufactured with durable synthetic materials to optimize continuous audio sound and to protect inserted media. Thus, the size of prior art CD players was largely controlled by the size of the components, rather than simplicity of design, affecting aesthetic aspects of the design. Furthermore, the functionality of prior art CD players led designers to implement a closed casing design technique, thereby using more materials and increasing the cost of the CD player. The present invention teaches a novel apparatus and method for playing digital audio music by incorporating a "floating" design technique which allows the media to dominate the implementation of the various CD player functions while increasing the player's cost-efficiency. The CD player of the illustrative embodiment is designed and engineered to do what a CD player was meant to do, play CDs, thereby decreasing the cost to manufacture the player compared to prior art players. The "floating" design is simple and fun, boasting a wide-open design technique that is visually pleasing while providing quality audio sound with integrity. Moreover, the illustrative embodiment CD player takes full advantage of advances in technology by incorporating smaller components in the exposed CD Player, which corresponds to a more compact, intriguing product. Those skilled in the art will appreciate that the teachings of the present invention are readily applicable to all kinds of optical media plays, recorders, duplicators, and integrated products.

The illustrative embodiment of the present invention is low cost CD audio player with a unique and desirable industrial design. A novel approach is employed that holds cost to a minimum yet delivers a desirable feature set in an attractive, unique package. A part of the target market for the illustrative embodiment is the gift-purchase consumer. The open CD player is a cost-effective solution in that it is a thoughtful and fun present to both give and receive. The exposed CD player of the illustrative embodiment takes the concept of today's CD player and takes it to the most basic level. There is an emphasis on simplicity of design, and the player creates a statement wherever it is placed. CD player technology has reached a point where the components have become smaller than the media, hence the floating design of the illustrative embodiment CD player. The CD player is very easy to use. The user merely inserts a CD by moving a swinging arm out of the way and placing the CD on a CD spindle hub. The illustrative embodiment CD player is provided to the consumer with stereo ear-bud earphones. It operates from internal AA size batteries, or a wall-plug transformer power adapter can be used. The simple user interface includes a PLAY/PAUSE button, a SKIP FORWARD button, a SKIP BACK button, and an OFF/VOLUME control. The illustrative embodiment CD player can play CD, CD-R, and CD-RW encoded discs in both twelve-centimeter and eight-centimeter sizes. Its dimensions are approximately 110 mm by 95 mm by 40 mm, and it weights under 200 grams.

Figure 1:
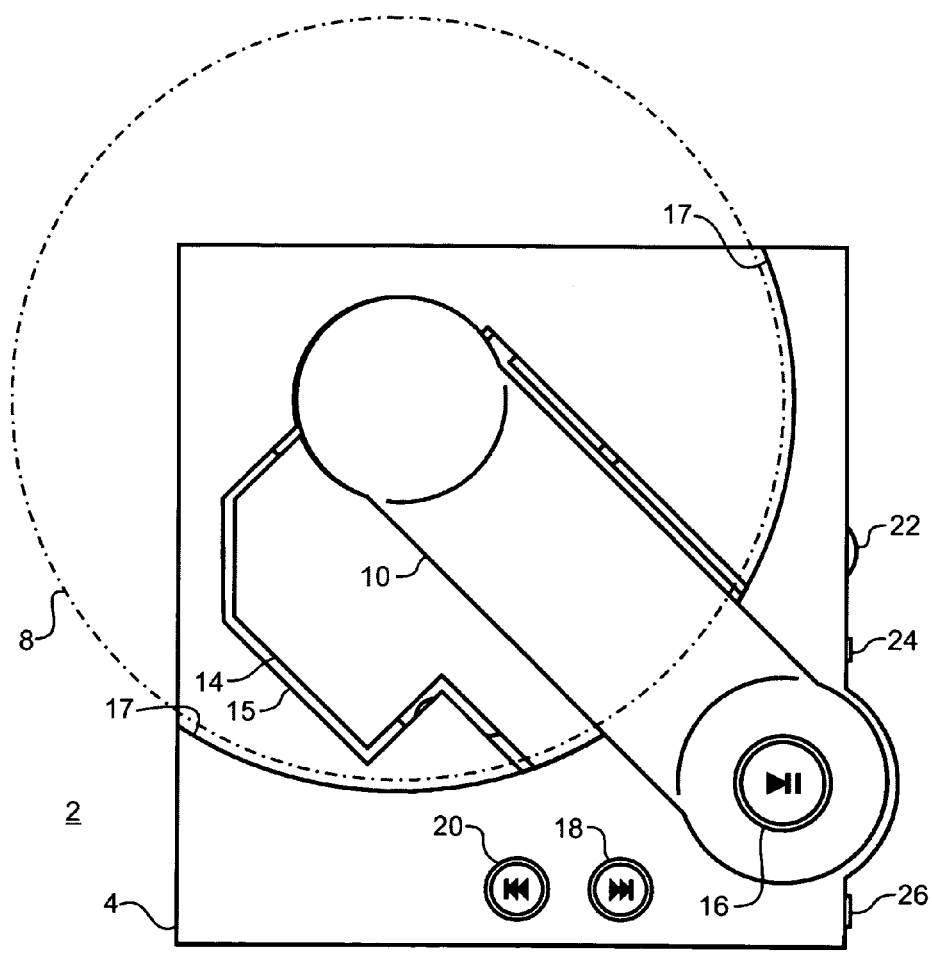
FIG. 1 is a front view drawing of a CD player according to an illustrative embodiment of the present invention.
Figure 4:
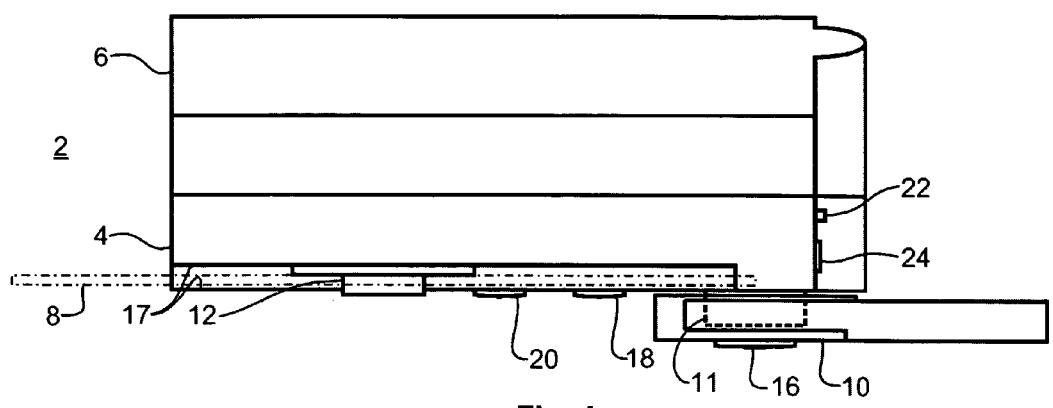
FIG. 4 is a top view drawing of a CD player according to an illustrative embodiment of the present invention.
Figure 3:
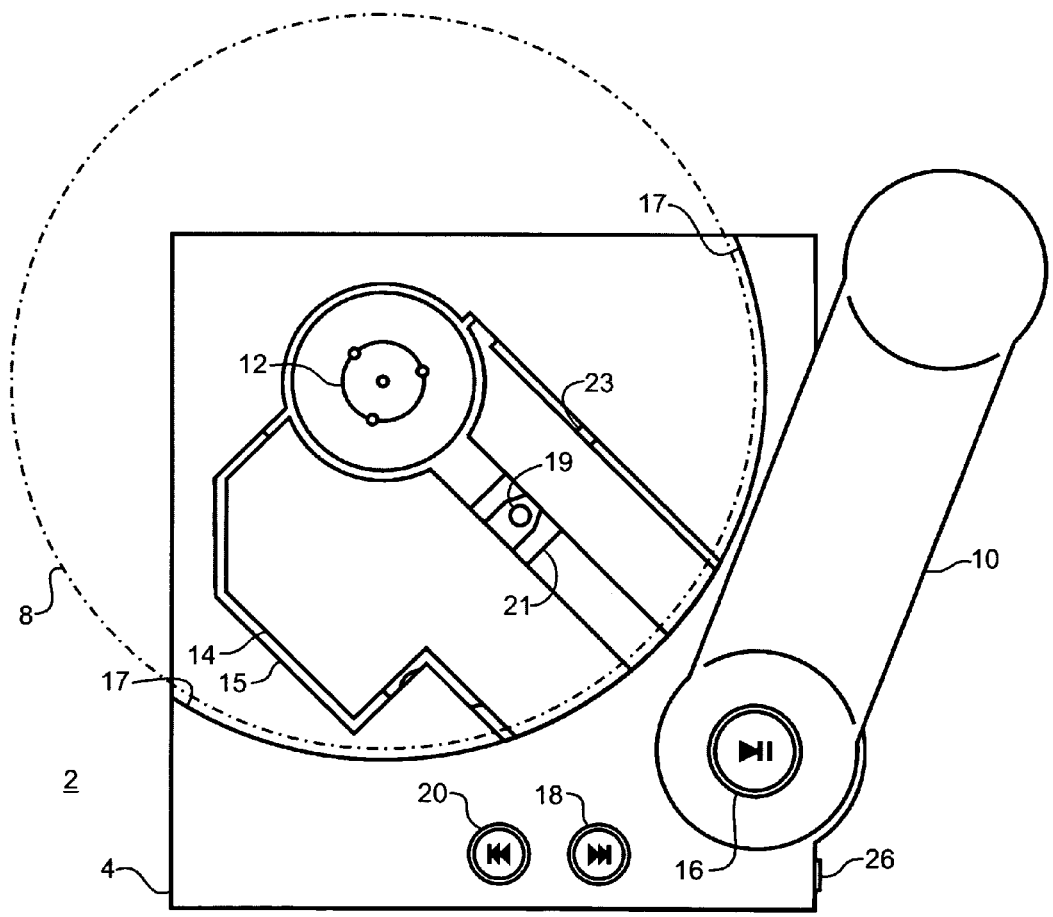
FIG. 3 is a front view drawing of a CD player according to an illustrative embodiment of the present invention.

Reference is directed to FIG. 1 and FIG. 2, which are a front view drawing and a top view drawing of a CD player with the protective arm in the closed position according to an illustrative embodiment of the present invention. Reference is also directed to FIG. 3 and FIG. 4, which are a front view drawing and a top view drawing of a CD player with the protective arm in the open position according to an illustrative embodiment of the present invention. The illustrative embodiment CD player 2 is based on a simple and inexpensive clamshell housing having a front half 4 and a back half 6 that fit together to form the low cost housing. A particular stylized industrial design is illustrated, however those skilled in the art will appreciate that a wide variety of shapes, colors, and textures could be employed to vary the design. The CD 8 (shown in phantom) attaches to the hub of a spindle 12 in a manner known to those skilled in the art. A recess 17 is formed into the front half 4 of the housing which partially conforms to the shape of the CD 8. Since the CD 8 is disposed on the exterior of the housing 4 and nearly adjacent to it, the recess 17 partially protects the CD 8 during operation, and adds a desirable element of style to the industrial design. In order to achieve this arrangement, the CD drive mechanism 14 is mounted within the housing 4 such that the spindle 12 protrudes to rotatably support the CD on the exterior of the housing.

The CD drive mechanism 14 is mass-produced by several suppliers, and the low cost aspect of the present invention invites the use of a mass produced drive mechanisms 14 in general. The drive mechanism is presented flush with an opening 15 formed in the front half 4 of the housing, with the spindles and hub 12 protruding slightly. This arrangement holds the CD very close to the exterior of the housing 4 and within the recess 17. Note that the compact drive mechanism 14 and the compact housing halves 4, 6 are smaller that the conventional twelve-centimeter compact disc. The spindle 12 is positioned near the edge of the housing 4 such that the swept area of the CD 8 is beyond the extent of the housing 4, creating a "floating" sensation during operation. Even the eight-centimeter sized "Pocket-CD" discs will extend beyond the edge of the housing 4 in the illustrative embodiment. The CD drive mechanism comprises the motor driven spindle 12 in combination with a laser scan head 19, as are known to those skilled in the art. The laser scan head 19 is a light emitting scan head, as well as having a light sensor for reading digital data from the CD 8. The head 19 rides along a linear track on guides 23, and within a scan head carriage 21. Thus, the head 19 traverses a linear path during operation, so as to read the CD 8. This arrangement creates two significant problems not found in prior art CD players. Since an open design is used, the spindle 12 and scan head 19, 21 are not protected from dirt, dust, and damaging physical contact. Also, extraneous emission of laser light emitted by the scan head 19 is dangerous to human eyes. However, these problems are obviated with use of a protective member 10, in the form of a swing arm 10.

The swing arm protective member 10 rotates about a hub 11 formed on the front of the housing 4. When positioned in a first position, illustrated in FIG. 1, the swing arm 10 covers the scan head 19 and the spindle 12, yet does not interfere with rotation and reading of the CD 8. The first position is also referred to as the closed position. At times when the user loads or unloads a CD, the swing arm 10 is rotated to a second position, illustrated in FIG. 3, which is away from the CD swept area, thus enabling mounting and dismounting of the CD from the spindle and hub 12. This is also called the open position. Since the swing arm 10 protects from extraneous laser emission, and since moving the arm away would tend to expose the laser head 19, an interlock switch is provided (not shown), which deactivates the laser head 19 or the whole drive mechanism when the swing arm is moved away from closed position.

As noted hereinbefore, low cost and simplistic designs are hallmarks of the illustrative embodiment. This philosophy is realized in a reduced user interface design in the illustrative embodiment. A simple On/Off and rotary volume control 22 is presented on the side of the housing 4. A headphone and audio output jack 24 is presented adjacent to the volume control 22. A PLAY/PAUSE actuator 16 is disposed on the axis of rotation of the swing arm 10, and couples to the internal components of the CD player through hub 11. A SKIP FORWARD actuator 18 and SKIP BACKWARD actuator 20 are presented on the front of the housing 4, and enable the user to advance a retard the audio track selected for playback. The operation of such controls is known to those skilled in the art. Finally, an external power connector 26 is provided for times when the user chooses not to rely upon an internal battery for power.

Reference is directed to FIG. 5 and FIG. 6, which are a left side view and a right side view drawing of the CD player 2 according to an illustrative embodiment of the present invention. The stylized design is readily apparent from these Figures. The rear portion 6 of the housing is tapered to reduce overall size and dimensions, yet allow internal space for the needed components. The position of the CD 8, the front housing 4, and recessed area 17 are apparent in these Figures. The CD drive mechanism 14 is shown inside the housing with the spindle 12 protruding through to the exterior of the front housing 4. The protective member 10 is shown in the closed position, and supported by hub 11, which extends from the front housing 4. The volume control 22 extends from the housing at the seam between the two halves 4, 6. The earphone jack 24 is illustrated, as is the external power connector 26. The PLAY/PAUSE actuator 16 is present, as well as the SKIP FWD 18 and SKIP BACK 20 actuators. The main printed circuit board 31 is disposed behind the drive mechanism 14. The main board 31 includes the drive controller, main controller, audio circuitry, and related components, as are known to those skilled in the art. A power supply printed circuit board 32 is disposed adjacent to the battery housing 33 and internal batteries 34. The power board 32 is a simple circuit used to interconnect the various power related components.

Figure 7:
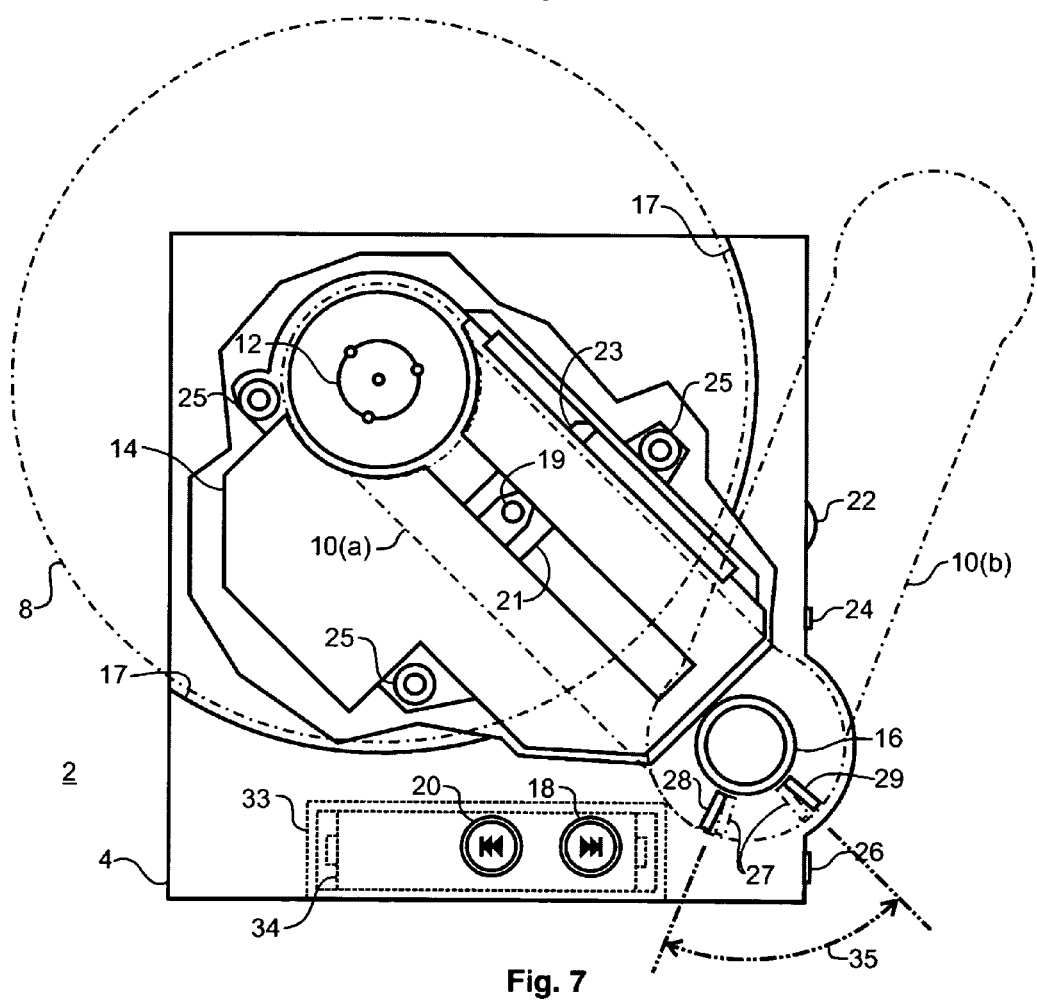
FIG. 7 is a front view drawing, with partial cut-away, of a CD player according to an illustrative embodiment of the present invention.

Reference is directed to FIG. 7, which is a front view drawing, with partial cut-away, of the CD player 2 according to an illustrative embodiment of the present invention. The front housing half 4 is shown in partial cut-away to illustrated the whole, CD drive mechanism 14. The swept arc of the CD 8 is illustrated, as is the recessed portion 17 of the housing. The CD drive mechanism 14 is supported within the housing by three vibration isolation mounts 25. The laser head 19 and track assembly 21, 23 are shown within the linear track opening. The battery holder 33 and batteries 34 are shown near the bottom of the housing. The position of the swing arm is shown in phantom in both the closed position 10(*a*) and the open position 10(*b*). The swing arm rotates about hub 11, which defines a swing arm axis of rotation. The extent of the rotation is limited by two stops 28, 29, which extend from the front of the housing 4. The two stops 28, 29 engage a boss 27 that extends from the swing arm 10. The first stop 29 defines the limit of rotation to the closed position, and the second stop 28 defines the limit or rotation for the open position. Thus, the two stops 28, 29 define an arc of rotation 35 of the swing arm protective member.

Figure 8:
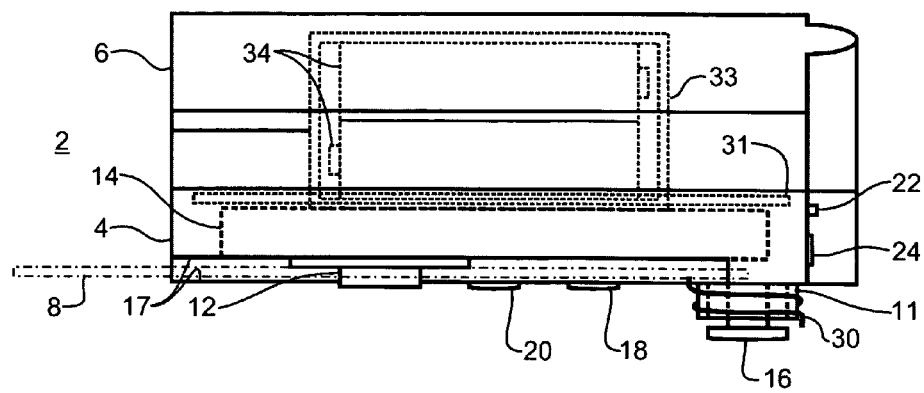
FIG. 8 is a top view drawing of a CD player according to an illustrative embodiment of the present invention.

Reference is directed to FIG. 8, which is a top view drawing of the CD player 2 according to an illustrative embodiment of the present invention. This Figure illustrates the internal components, as viewed from above the apparatus 2. Note the location of the battery holder 33 and batteries 34. The main printed circuit board 31 can be seen behind the drive mechanism 14. The spindle 12, recessed area 17, and CD 8 are visible as well. Note in particular the arrangement of the PLAY/PAUSE actuator 16, which extends through the swing arm hub 11. A spring 30 is disposed about the hub 11. A first end of the spring 30 engages the housing 4 and the second end engages the swing arm (not shown). The spring 30 is further arranged to urge the swing arm toward the first position, also called the closed position. This is a safety feature in that the swing arm will be in the closed, or protected, position absent some effort by the user. Thus, the only time that the swing arm is in the open position is when the user forces it there, to mount or dismount a CD.

Figure 9:
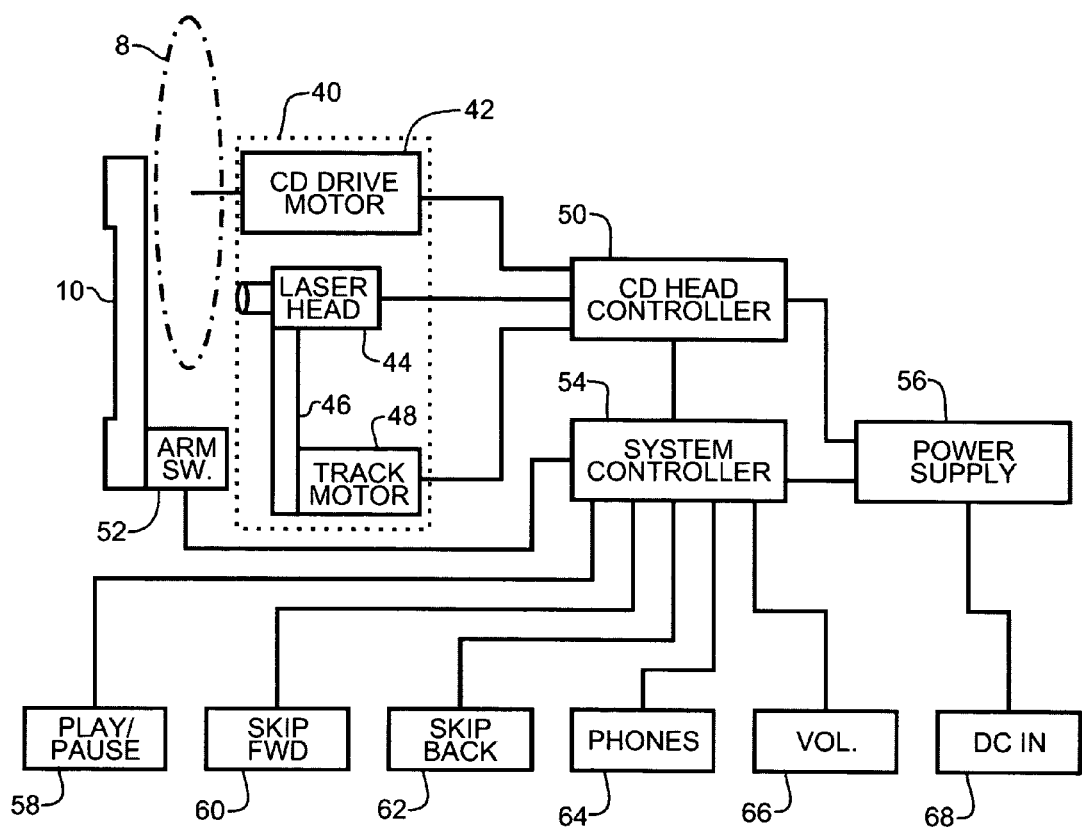
FIG. 9 is a functional block diagram of a CD player according to an illustrative embodiment of the present invention.

Reference is directed to FIG. 9, which is a functional block diagram of a CD player according to an illustrative embodiment of the present invention. The CD drive mechanism 40 is comprised of a CD drive motor 42, a laser head 44, the head track motor 48, and the head track 46. The CD drive motor 42 is coupled to rotate the CD 8 during playback operation. The design and operation of the CD drive mechanism 40 is understood by those skilled in the art. A CD head controller 50 is coupled to operate and control all of the internal components to the CD drive mechanism 40. Such controllers have been developed for dedicated CD player functions, and are known to those skilled in the art. A main system controller 54 is provided, which communicates with the CD head controller 50 and interfaces to the various other components of the apparatus. The system controller 54 is a dedicated microcontroller, with associated audio circuitry, programmed to embody the various functions and feature of the illustrative embodiment apparatus. Any controller technology known by those skilled in the art to be useful for portable dedicated control device applications is suitable for use as system controller 54. A power supply 56 provides power to the apparatus, and in the illustrative embodiment, the power supply is a pair of standard 'AA' sized batteries in a battery holder. A DC input connector 68 is provided for use with an external power supply, as are known to those skilled in the art.

The system controller 54 is coupled to the various user interface controls. Several of these are contact-closure actuator, which include the PLAY/PAUSE actuator 58, the SKIP FWD actuator 60, and the SKIP BACK actuator 62. The headphone jack 64 and volume potentiometer 66 are coupled to the audio circuit portion of the system controller 54. The swing arm 10 engages a contact closure switch 52 that is coupled as an input to the system controller 54. The switch 52 activates when the arm 10 is moved away from the closed position. As such, the system controller is alerted to the movement and can respond in a suitable fashion. The system controller 54 can respond by deactivating the laser head 44 to prevent laser light emission. The system controller 54 can also respond by shutting down power to the CD drive motor 42 thereby stopping the rotation of the CD 8. The system controller 54 can also respond by shutting down the entire CD mechanism 40. All of these responses are communicated from the system controller 54 to the CD head controller 50. Once the arm switch 52 returns to the closed position state, normal operation of the apparatus can resume.

Figure 10:
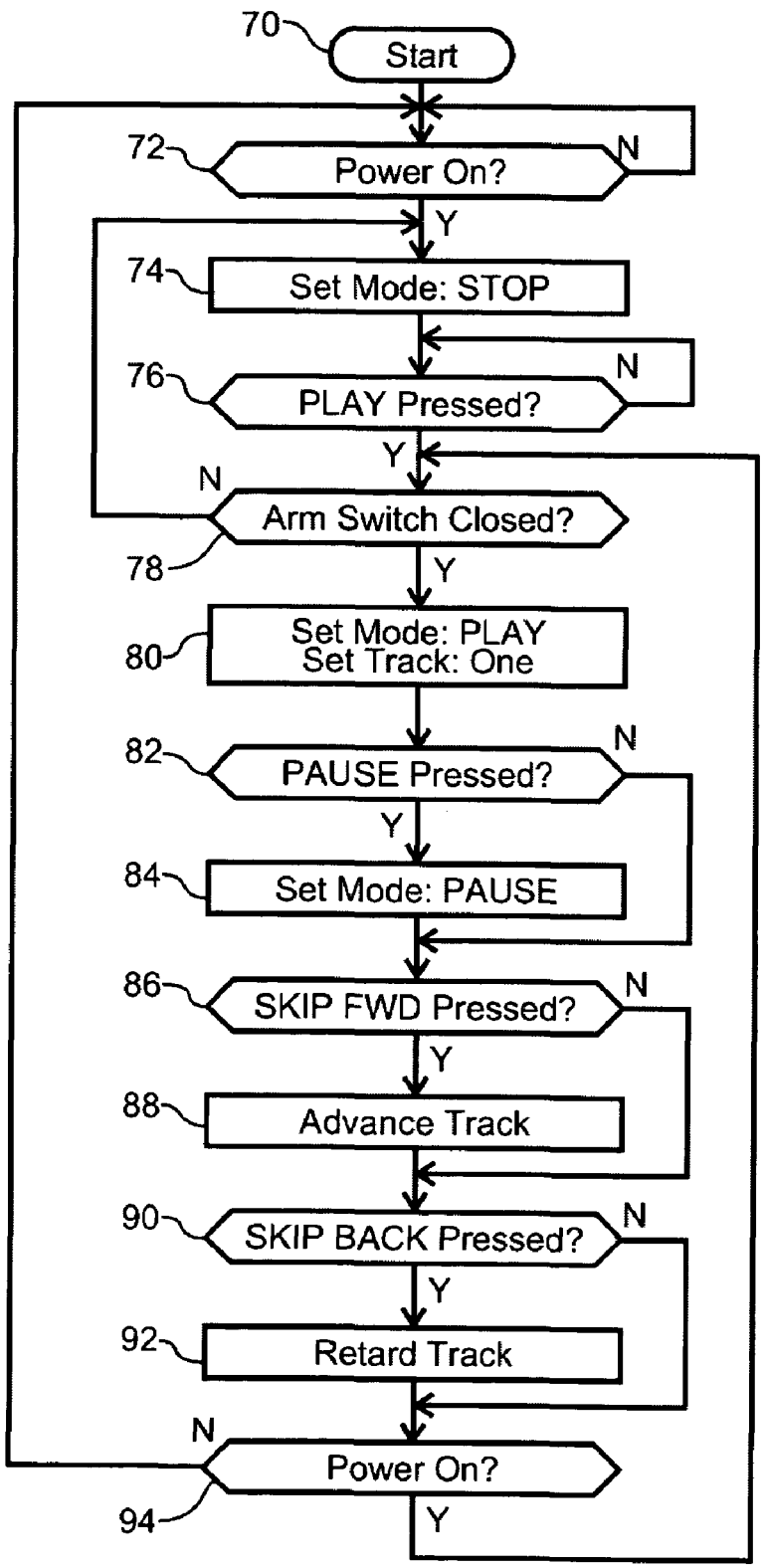
FIG. 10 is a process flow diagram according to an illustrative embodiment of the present invention.

Reference is directed to FIG. 10, which is a process flow diagram according to an illustrative embodiment of the present invention. The process begins at step 70 and proceeds to step 72 to detect if the user has turned on power by rotating the volume control to engage power to the circuitry of the apparatus. If the power is turned on at step 72, flow proceeds to step 74 where the mode of the apparatus is set to STOP. The STOP mode is an idle state, awaiting mounting of a CD and activation of another command. At step 76 a test is conducted to determine of the PLAY/PAUSE actuator has been pressed. If it has, then flow proceeds to step 78 to test if the swing arm switch is closed, indicating that the swing arm is in the closed, and safe, position. If the arm is open, the process returns to step 74 and remains in the stop mode. The user must allow the swing arm to move to the closed position. If the arm is closed at step 78, then flow proceeds to step 80 where the mode is set to PLAY and the first CD track is set as the currently playing track. The PLAY mode is a mode where the CD is rotated and the laser head begins reading and decoding the audio data, which is reproduced to the earphone jack of the apparatus. Flow then proceeds to step 82 where a test is made to determine is the user has pressed the PLAY/PAUSE actuator, invoking the PAUSE function. Flow then proceeds to step 84 where the mode is set to PAUSE. The PAUSE mode stops sequential playing of the audio, but keeps rotating the CD. Steps 86 and 90 conduct tests to determine of the SKIP FWD and SKIP BACK actuators have been pressed. If so, then the currently playing track is advanced or retarded at steps 88 and 92, respectively. Essentially, steps 82 though 92 scan for actuation of the user controls and respond accordingly. Finally, at step 94 the power on mode is checked. If the power is shut off, flow returns to the power on step 72. If power remains on at step 94, then flow returns to retest the arm switch condition at step 78.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for reading an optical disc; comprising:
   an external housing enclosing substantially all of the apparatus;
   a spindle positioned to rotatably support the optical disc adjacent to the exterior of said external housing;
   a light emitting scan head aligned to read the optical disc, and
   a protective member, having a silhouette that is smaller than the area of the optical disc, movably coupled to said external housing and manually operable from a first position that aligns said protective member to prevent extraneous emission of light from said scan head, to a second position that enables access to mount the optical disc on said spindle.

2. The apparatus of claim 1 wherein the apparatus is an audio CD player.

3. The apparatus of claim 1 wherein said spindle is positioned relative to said external housing such that a substantial portion of the rotating optical disc extends beyond the surface of said external housing.

4. The apparatus of claim 1 wherein said external housing has a recess formed on its exterior surface that partially conforms to the shape of the optical disc, and wherein said spindle is positioned to support the optical disc within said recess.

5. The apparatus of claim 1 wherein said protective member extends to cover said spindle while aligned in said first position.

6. The apparatus of claim 1 wherein said scan head traverses a linear path when reading the optical disc, and wherein said protective member covers said linear path while aligned in said first position.

7. The apparatus of claim 1 wherein said protective member is movable about an axis of rotation that is parallel to the spindle axis.

8. The apparatus of claim 1, further comprising a spring disposed between said external housing and said protective member, said spring operable to urge said protective member toward said first position.

9. The apparatus of claim 1, further comprising an actuator operable to detect movement of said protective member.

10. The apparatus of claim 9 wherein said actuator is coupled to deactivate light emission from said scan head when said protective member is manually urged away from said first position.

11. The apparatus of claim 9 wherein said actuator is coupled to stop rotation of said spindle if said protective member is manually urged away from said first position.

12. An apparatus for playing a CD audio optical disc; comprising:
   an external housing enclosing substantially all of the apparatus and having a recess formed on its exterior surface that partially conforms to the shape of the optical disc;
   a spindle for rotatably supporting the optical disc adjacent to the exterior of said external housing and within said recess, and positioned relative to said external housing such that a substantial portion of the rotating optical disc extends beyond the surface of said external housing;
   a light emitting scan head aligned to traverse a linear path and read the optical disc, and
   a protective member, having a silhouette that is smaller than the area of the optical disc, rotatably coupled to said external housing about an axis of rotation that is parallel with the spindle axis, said protective member manually operable from between a first position that aligns said protective member to prevent extraneous emission of light from said scan head by covering said path traversed by said scan head and extending to cover said spindle, and a second position that enables access to mount the optical disc on said spindle;
   a spring disposed between said external housing and said protective member, said spring operable to urge said protective member toward said first position;
   an actuator operable to detect movement of said protective member, and wherein
   said actuator is coupled to deactivate light emission from said scan head and stop rotation of said spindle when said protective member is manually urged away from said first position.

13. A CD player comprising:
   an external housing enclosing substantially all of CD player;
   a rotating drive mechanism which provides a means for coupling a CD with said external housing; and
   a pivoting protective member having one end mounted to said external housing exterior, a shaft diagonally transverse said external housing, and another end covering said rotating drive mechanism.

14. The CD Player of claim 13 wherein, said external housing comprises a plurality of housing components such that when fitted together said housing components provide a means for said external housing to rest thereupon.

15. The CD Player of claim 13 wherein said external housing further comprises:
   a CD player drive module which is comprised of;
   a servo motor and control processor, connected electrically to said rotating drive mechanism, providing a means for rotating a CD fixed to said rotating drive mechanism, and
   a laser diode and photo-transistor optical pair, a linear track, a motor coupled with gear drive and belt assembly, and said control processor, all mounted below said protective member, providing a means for said optical pair to track digital data encoded on a CD by oscillating along said linear track, parallel to said protective member, and
   an interface module which is comprised of;
   an interface processor and a plurality of contact closure actuators providing a means for user control of said CD player functions, and wherein
   said interface processor and an audio output circuit providing a means for said CD player to output audio signals wherein said audio output circuit is electrically connected to said base structure via a connection;

a power supply module which is comprised of:

a power cell charging circuit, a power cell receptacle circuit covered by a removable portion of said external housing, and a direct current (DC) input circuit wherein said circuits provide a means for supplying said CD player with a plurality of power means.

16. A method of reading an optical disc in an apparatus having an external housing enclosing substantially all of the apparatus with a spindle positioned to rotatably support the optical disc adjacent to the exterior of the external housing, and a light emitting scan head aligned to read the optical disc, and a protective member having a silhouette that is smaller than the area of the optical disc, the method comprising the steps of:

moving the protective member to a first position that aligns the protective member to prevent extraneous emission of light from the scan head, and manually urging the protective member to a second position, thereby enabling access for mounting the optical disc on the spindle.

17. The method of claim 16 wherein the spindle is positioned relative to the external housing such that a substantial portion of the rotating optical disc extends beyond the surface of the external housing.

18. The method of claim 16 wherein the protective member extends to cover the spindle when moved to said first position.

19. The method of claim 16 wherein the scan head traverses a linear path when reading the optical disc, and wherein the protective member covers said linear path when moved to said first position.

20. The method of claim 16 further comprising the step of moving the protective member about an axis of rotation that is parallel to the spindle axis.

21. The method of claim 16, further comprising the step of urging the protective member toward said first position by spring force.

22. The method of claim 16, further comprising the step of detecting movement of the movable member away form said first position.

23. The method of claim 22, further comprising the step of deactivating light emission from the scan bead upon detecting movement of the protective member.

24. The method of claim 22, further comprising the step of stopping the rotation of the upon detecting movement of the protective member.

* * * * *